United States Patent
Papa, III et al.

(10) Patent No.: US 9,042,922 B2
(45) Date of Patent: May 26, 2015

(54) CENTRALIZED SYSTEM AND METHOD FOR AUTOMATED CARRIER STATUS UPDATES VIA SMS IN A MULTI-CARRIER ENVIRONMENT

(71) Applicant: Penske Truck Leasing Co., L.P., Reading, PA (US)

(72) Inventors: Charles A. Papa, III, Glenmoore, PA (US); Percy R. Bhathena, Cleveland Heights, OH (US); Douglas J. Koch, Stow, OH (US); Michael Viggilucci, Solon, OH (US); Jermaine G. Sargeant, Shaker Heights, OH (US)

(73) Assignee: PENSKE TRUCK LEASING CO., L.P., Reading, PA (US)

( * ) Notice: Subject to any disclaimer, the term of this patent is extended or adjusted under 35 U.S.C. 154(b) by 369 days.

(21) Appl. No.: 13/624,675

(22) Filed: Sep. 21, 2012

(65) Prior Publication Data

US 2014/0087772 A1  Mar. 27, 2014

(51) Int. Cl.
   *H04W 4/00*   (2009.01)
   *H04L 29/06*   (2006.01)
   *G06Q 10/04*   (2012.01)

(52) U.S. Cl.
   CPC ........ *H04L 29/06176* (2013.01); *G06Q 10/047* (2013.01)

(58) Field of Classification Search
   CPC ....................................................... H04W 4/14
   USPC .............. 455/412.1–420, 458, 466, 517–520, 455/569.1–569.2, 575.9
   See application file for complete search history.

(56) References Cited

U.S. PATENT DOCUMENTS

| 5,365,516 | A * | 11/1994 | Jandrell ........................ 370/335 |
| 7,233,814 | B2 * | 6/2007 | Wissinger et al. .......... 455/569.2 |
| 2002/0061758 | A1 * | 5/2002 | Zarlengo et al. .............. 455/517 |
| 2007/0190930 | A1 * | 8/2007 | Fuller et al. .................. 455/3.06 |
| 2009/0176457 | A1 * | 7/2009 | Christensen et al. ........... 455/69 |
| 2012/0196618 | A1 * | 8/2012 | Lowell et al. .............. 455/456.1 |

* cited by examiner

*Primary Examiner* — Sharad Rampuria
(74) *Attorney, Agent, or Firm* — Drinker Biddle & Reath LLP

(57) ABSTRACT

A method for managing carrier status via the Short Message Service (SMS) by a centralized system in a multi-carrier environment includes: associating a driver with a first load to be transported, using an SMS-enabled cellphone number of the driver; storing the association of driver and load in a database of the system, along with a unique identifier of the carrier; transmitting, by the server to the driver, an instruction as a text message to the driver's cell phone with instructions for replying upon arrival; receiving, by the server from the driver, a response consistent with the instructions for replying upon arrival; updating, by the server, a status associated with the driver's response in the database; repeating the steps for a second driver of a second carrier; and providing, by the centralized system, status reports related to both the driver and associated load, and the second driver and associated load.

22 Claims, 14 Drawing Sheets

| Status Reporting | Accept/Reject | Carrier Summary | Communication Board | Canceled Loads | Load Planner – Auction | Carrier – Auction |
|---|---|---|---|---|---|---|
| Carrier: AVTG – Advantage Transportation | | | Action: All | | Trailer = | |
| From: 08/16/2011 | HH:MM | | Load ID: | | Load Tracking = | |
| To: 09/30/2011 | HH:MM | | Time Zone: | Use local time | Use Time Zone Selector | |
| | | | Search | | | |

| Load ID | Load Tracking # | TZ | Route Date | Status | Response Required | Service | Equipment Type | Total Stops | Total Cost | Total Weight | Total Distance | Load Tender Report | Cmmt | Accept | Reject | Reason Code |
|---|---|---|---|---|---|---|---|---|---|---|---|---|---|---|---|---|
| | | | | | | | | | | | | | | | | |

Tender Accept

Name – First Stop:   Address – First Stop:

Name – Last Stop:   Address – Last Stop:

Tender Accepted By:   Load Tracking Number:

Estimated Time at First Stop:   Actual Carrier Service:

Vehicle Information

Driver:   Driver Phone Number:

Trailer Number:   Seal Number:

Trailer Owner:   Trailer License Number:

Tractor Owner:   Tractor License Number:

| Status Reporting | Accept/Reject | Carrier Summary | Communication Board | Canceled Loads | Load Planner – Auction | Carrier – Auction |
|---|---|---|---|---|---|---|

| Carrier: AVTG – Advantage Transportation | | Action: All | | Trailer = | |
|---|---|---|---|---|---|
| From: 08/16/2011 | HH:MM | Load ID: 8674682 | | Load Tracking = | |
| To: 09/30/2011 | HH:MM | Sort Order: Load ID | | | |
| Status Update | ETA | Time Zone: | | | |
| | Appointment | | Use Local Time | Use Time Zone Selector | |
| | | Search | | | |

400-4

| Load ID | Load Tracking # | Stop | TZ | Stop Type | Site | Sched Arrvl. | Sched Dprt | Act Arrvl Date | Act Arrvl Time | Arrvl RSN | Act Dprt Date | Act Dprt Time | Dprt RSN | Trailer Number | Cmmt | Update Status |
|---|---|---|---|---|---|---|---|---|---|---|---|---|---|---|---|---|
| | | | | | | | | | | | | | | | | |
| | | | | | | | | | | | | | | | | |

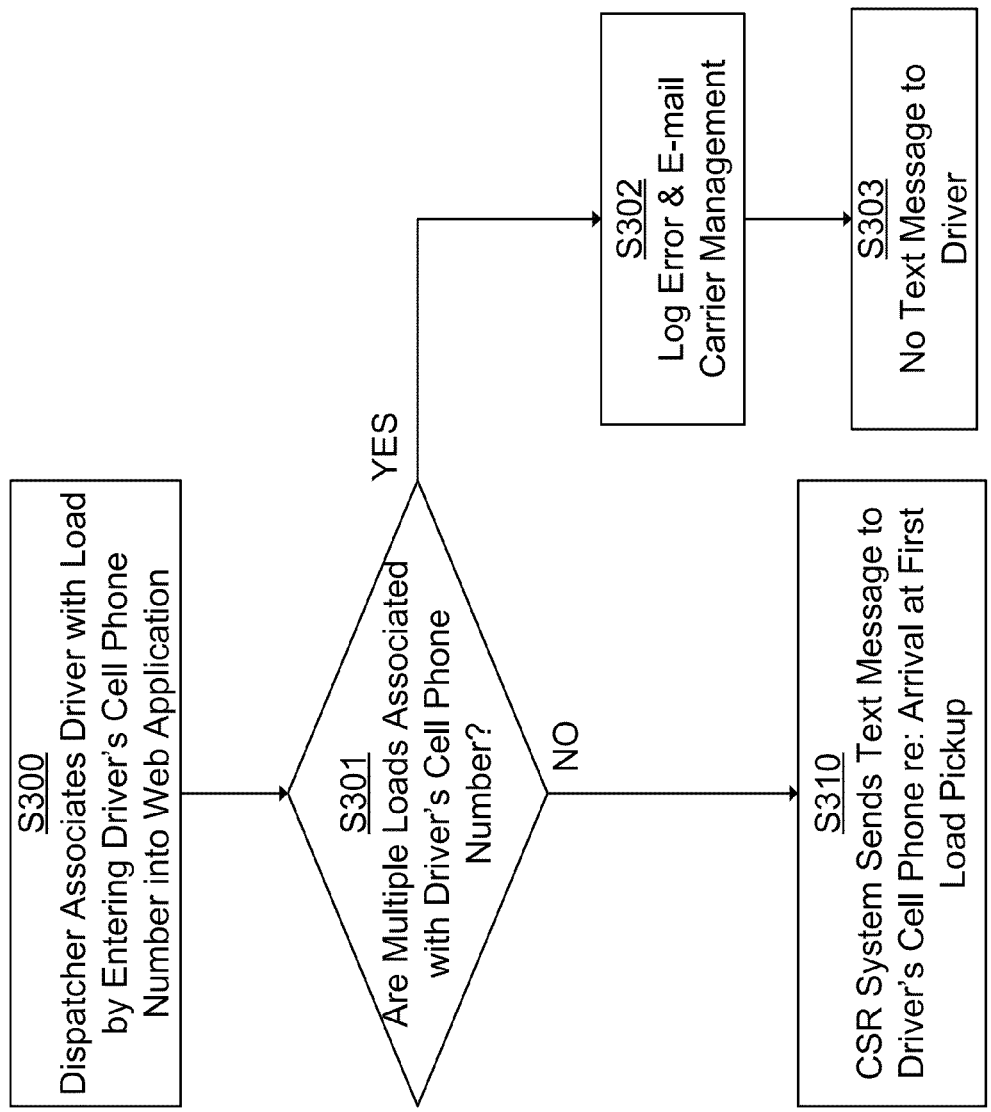

CENTRALIZED SYSTEM AND METHOD FOR AUTOMATED CARRIER STATUS UPDATES VIA SMS IN A MULTI-CARRIER ENVIRONMENT

BACKGROUND

Embodiments disclosed herein relate a system and method for carrier status updates, and more specifically to a system and method for automated carrier status updates and reporting via Short Message Service (SMS).

Conventional systems for carrier status updates typically use Electronic Data Interchange (EDI) or rely on tractors with "in-cab" technology. However, many carriers do not have access to EDI and/or their tractors are not equipped with "in-cab" technology. To obtain carrier status updates for loads without these technologies, carriers must rely on telephone communications between a dispatcher and the drivers assigned to the loads. Since a single dispatcher is typically responsible for multiple drivers on multiple routes with multiple loads, telephone communications between the dispatcher and the drivers can become hectic and cause errors in status updates. For example, it can be difficult for the dispatcher to keep track of the drivers and loads on a real-time basis, and it can also be difficult for the drivers to update and obtain status for their routes and loads on a real-time basis. Errors often occur due to miscommunication between the drivers and dispatchers, thus resulting in loss of time, resources, and revenue for the carriers.

It would be advantageous to provide a way to send and receive load status updates for carriers that do not have EDI or tractors with "in-cab" technology through the use of a centralized system across multiple carriers to utilize a uniform standard for carrier status updates that could be easily deployed globally. Because SMS (or text messaging service) is a global standard, a centralized system for automated carrier status updates and reporting via SMS across multiple carriers would be a more cost-effective alternative. Furthermore, a centralized system for automated carrier status updates and reporting via SMS would be accessible to more drivers, since the system only requires a driver to use an SMS enabled phone without any other specific hardware, and a carrier can easily adapt to using the centralized system.

SUMMARY

As described herein, various embodiments relate to a method and system for a centrally administered automated carrier status updates and reporting via SMS (CSR System) that accommodates a plurality of carriers. The CSR System provides a common framework and allows a carrier to easily integrate the reporting of carrier status updates. The CSR System allows any driver of any carrier with any SMS enabled phone to send and receive load and/or route status update text messages. The CSR System eliminates the need for a carrier to provide a significant hardware outlays for its drivers—it also eliminates the need to install applications on the driver's phone, and no special data rate plan is necessary.

The CSR System thus maintains a database that is able to coordinate status across a plurality of carriers and associates the status communications with a unique identifier for each carrier.

Furthermore, the CSR System allows the driver to use "short hand" messages, which simplifies data entry. Such short hand messages may differ across carriers, and thus the centralized system may serve as a translator that provides common functionality, but in a manner that varies in the format that is dependent on the carrier. Since people are generally familiar with sending text messages, the CSR System requires minimal training, thus reducing setup time and costs. In addition, the CSR System provides near real-time visibility for carrier status updates. In certain embodiments, the position of the driver may also be determined using Location Based Services (LBS).

One embodiment provides a method for managing carrier status via the Short Message Service (SMS) by a centralized system in a multi-carrier environment. The method includes: a) associating, by a dispatcher of a carrier, a driver with a first load to be transported, using an SMS-enabled cellphone number of the driver; b) storing the association of driver and load in a database of the system using a centralized server including a processor and non-volatile storage media, along with a unique identifier of the carrier; c) transmitting, by the server to the driver, a first instruction as a text message to the driver's cell phone, wherein the first instruction contains information about the first load's location, along with instructions for replying upon arrival; d) receiving, by the server from the driver, a first response consistent with the instructions for replying upon arrival; e) updating, by the server, a status associated with the driver's first response in the database; f) transmitting, by the server to the driver, a second instruction as a text message to the driver's cell phone, wherein the second instruction contains instructions for replying upon departure; g) receiving, by the server from the driver, a second response consistent with the instructions for replying upon departure; h) updating, by the server, a status associated with the driver's second response; i) repeating (a)-(h) for a second load to be transported for the driver; j) repeating (a)-(i) for a second driver of a second carrier; and h) providing, by the centralized system, status reports related to both the driver and associated load, and the second driver and associated load.

Another embodiment provides a system for managing carrier status via the Short Message Service (SMS) by a centralized system in a multi-carrier environment. The system includes a centralized server that includes: a processor; a database that associates a plurality of drivers of a plurality of carriers with a plurality of load to be transported, using an SMS-enabled cellphone number of each driver; a non-volatile storage media that stores the association of each driver and each load in the database using the centralized server, along with a unique identifier of each carrier; a transmitter that transmits to each driver an instruction as a text message to each driver's cell phone, wherein the instruction contains information about each load's location, along with instructions for replying upon arrival or departure; a receiver that receives from each driver, a response consistent with the instructions for replying upon arrival or departure; and the database updates a status of each load associated with each driver's response in the database; wherein the centralized server provides, to each respective carrier, status reports related to each driver of the respective carrier and the associated load.

BRIEF DESCRIPTION OF THE DRAWINGS

Various embodiments are illustrated in the drawings and following discussion:

FIGS. 2A and 2B illustrate a screen shot of a CSR System web application of the CSR System of FIG. 1;

FIG. 6 illustrates another screen shot of the CSR System web application of FIGS. 2A and 2B;

FIG. 10 is a flow chart illustrating a method for exception processing when multiple loads are associated with a single driver, according to an embodiment.

DETAILED DESCRIPTION

As described herein, various embodiments relate a centralized method and system for automated carrier status updates and reporting via SMS in a multi-carrier environment. According to an embodiment, automated carrier status updates can be performed through the use of an SMS enabled phone and a CSR System. The CSR System is accessible to carriers via the Internet, for example, through a web application.

In general terms, when a load is tendered to a carrier, a carrier dispatcher assigns a driver to the load by entering the driver's cell phone number into the web application. The CSR System then stores the driver's cell phone number into a database and associates the driver with the load and the route. At a predetermined time before a scheduled event, the CSR System sends the driver a text message, which prompts the driver through the process of the load pickup and delivery. The driver responds to the text message prompts transmitted from the CSR System, and the CSR System uses the driver's text message responses to update the load status in the database and the web application automatically. Thus, the CSR system eliminates the need for the driver to call into the dispatch office to notify the dispatcher of the delivery progress.

Figure 1:
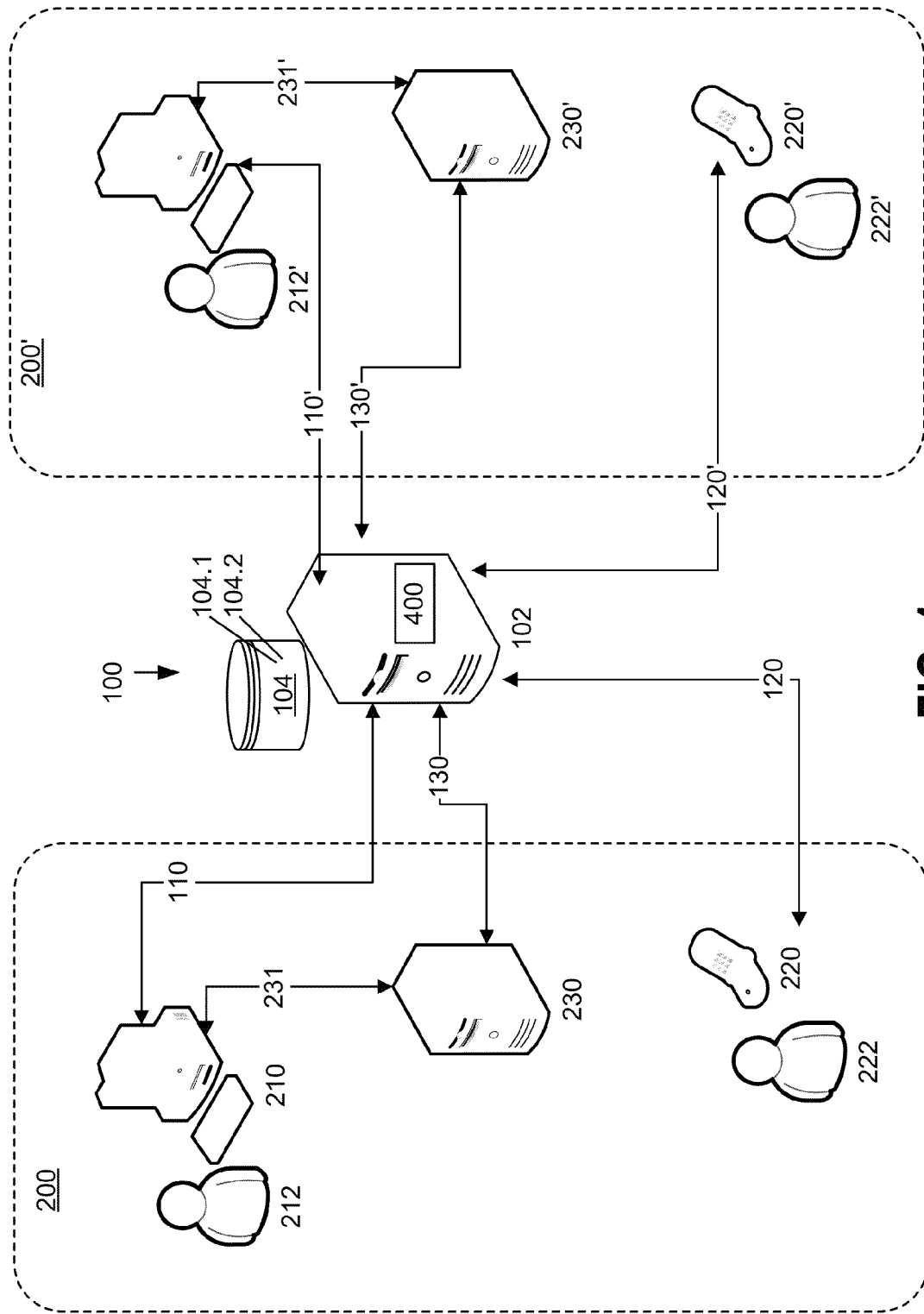
FIG. 1 is a block diagram of a network including a system for automated carrier status updates and reporting via SMS (CSR System), according to an embodiment.

In more detail, FIG. 1 is block diagram of a network including a centralized system 100 for automated carrier status updates and reporting via SMS (CSR System 100) in a multi-carrier environment, according to an embodiment. As illustrated in FIG. 1, the network includes the CSR System 100, a first carrier 200, and a second carrier 200'. The CSR System 100 includes a CSR System server 102 and a CSR System database 104 associated with the server 102. The database 104 manages information 104.1 associated with the first carrier 200 and information 104.2 associated with the second carrier 200', and the system 100 assigns a unique identifier to each carrier 200, 200'.

The first carrier 200 includes a first carrier computer 210 operated by a first carrier dispatcher 212, a first carrier driver 222 operating a first SMS enabled cell phone 220, and a first carrier server 230. Similarly, the second carrier 200' includes a second carrier computer 210' operated by a second carrier dispatcher 212', a second carrier driver 222' operating a second SMS enabled cell phone 220', and a second carrier server 230'.

The CSR System server 102, the carrier computers 210, 210', the SMS enabled cell phones 220, 220', and the carrier servers 230, 230' each includes a receiver and a transmitter for data communication with other devices. The CSR System server 102 receives data from and transmits data to the first and second carrier computers 210, 210' via communication links 110, 110', respectively. The first and second carrier dispatchers 212, 212' enters carrier, load, route, driver, and other information into a web application hosted by the CSR System server 102, and the entered information are stored in the CSR System database 104.

The CSR System server 120 also transmits text messages to and receives text messages from the first and second SMS enabled cell phones 220, 220' via communication links 120, 120', respectively. The text messages are also stored in the CSR System database 104 and are used to update the status of loads and routes for each carrier. Furthermore, the CSR System server 102 transmits data to and receives data from the first and second carrier servers 230, 230' via communication links 130, 130', respectively. For example, the CSR System 100 may send messages or e-mails to the management of the first carrier 200, where the messages or e-mails are transmitted from the CSR System server 120 to the first carrier server 230. Moreover, the CSR System 100 may communicate with multiple carriers and multiple SMS enabled cell phones simultaneously.

FIG. 1 shows two carriers, but any number of carriers may be associated with the system. FIG. 1 also shows one driver with one cell phone, and one dispatcher associated with each carrier, but any number of these could be associated with the carrier as well. In the following, a single reference character may be used to represent multiple elements—for example, a "dispatcher 212" may be referenced, but this could possibly include a first 212 and second 212' dispatcher.

FIGS. 2A and 2B illustrate screen shots of a CSR System web application 400 of the CSR System 100 of FIG. 1 that may be used by the dispatcher. The carrier dispatcher 212, typically access the CSR System 100 using the CSR System web application 400. This web application 400 may present a screen to the user that includes a series of tabs or menu items, including status reporting, load accept/reject, carrier summary, communication board, canceled loads, load planner-auction, and carrier-auction. The server 102 comprises the web-based server portion 400, which is accessible by any type of common web client on computers of the carrier 200.

For example, the carrier 200 can make load pickup appointments using the CSR System web application 400. Once the load pickup appoints are made, the CSR System 100 checks the load pickup times in the CSR System database 104 to determine whether multiple pickups are within a predetermined period of time and whether text messages should to be sent to drivers' cell phones.

To begin the process, the dispatcher 212 accesses the Accept/Reject Page 400-1 of the CSR System web application 400, as shown in FIG. 2A, via the carrier computer 210. A load can be "tendered" or "tender accepted," or it can be "rejected." To further use the CSR System 100, however, the status of the load must be "tendered" or "tender accepted", and not "rejected". A load can be accepted by any user on behalf of the carrier 200, for example, the dispatcher 212, using the CSR System web application 400. If the status of load is "tendered", the carrier 200 can accept or reject it. A driver's phone number can be entered into the CSR System web application 400 when the carrier 200 accepts the load, where the load status becomes "tender accepted". If the status of the load is already "tender accepted," but the driver's phone number is not entered, the phone number can be entered by any user on behalf of the carrier 200 using the CSR System web application 400 (regardless how and who accepted the load).

The Accept/Reject Page 400-1 may comprise various information, such as the carrier identification, the time period over which loads are scheduled to be picked up and delivered, the time zone, a load identifier, trailer ID, load ID, and provides a field for searching relevant information in the database 104. When searching for loads on the Accept/Reject Page 400-1, various filtering criteria can be used. For instance, the "Action" field filters the search results by load status and has three choices: "Tendered", "Accepted", and "All". If a user selects "All," meaning all of the above, both "Tendered" and "Accepted" loads will be displayed in the search results.

Once the load is in the "Tender Accepted" status as shown in Load Status Page 400-2, the dispatcher 212 can assign a driver to the load by inputting the driver's cell phone number into the Load Status Page 400-2 using the "Driver Phone Number" field, as shown in FIG. 2B.

Figure 3A:
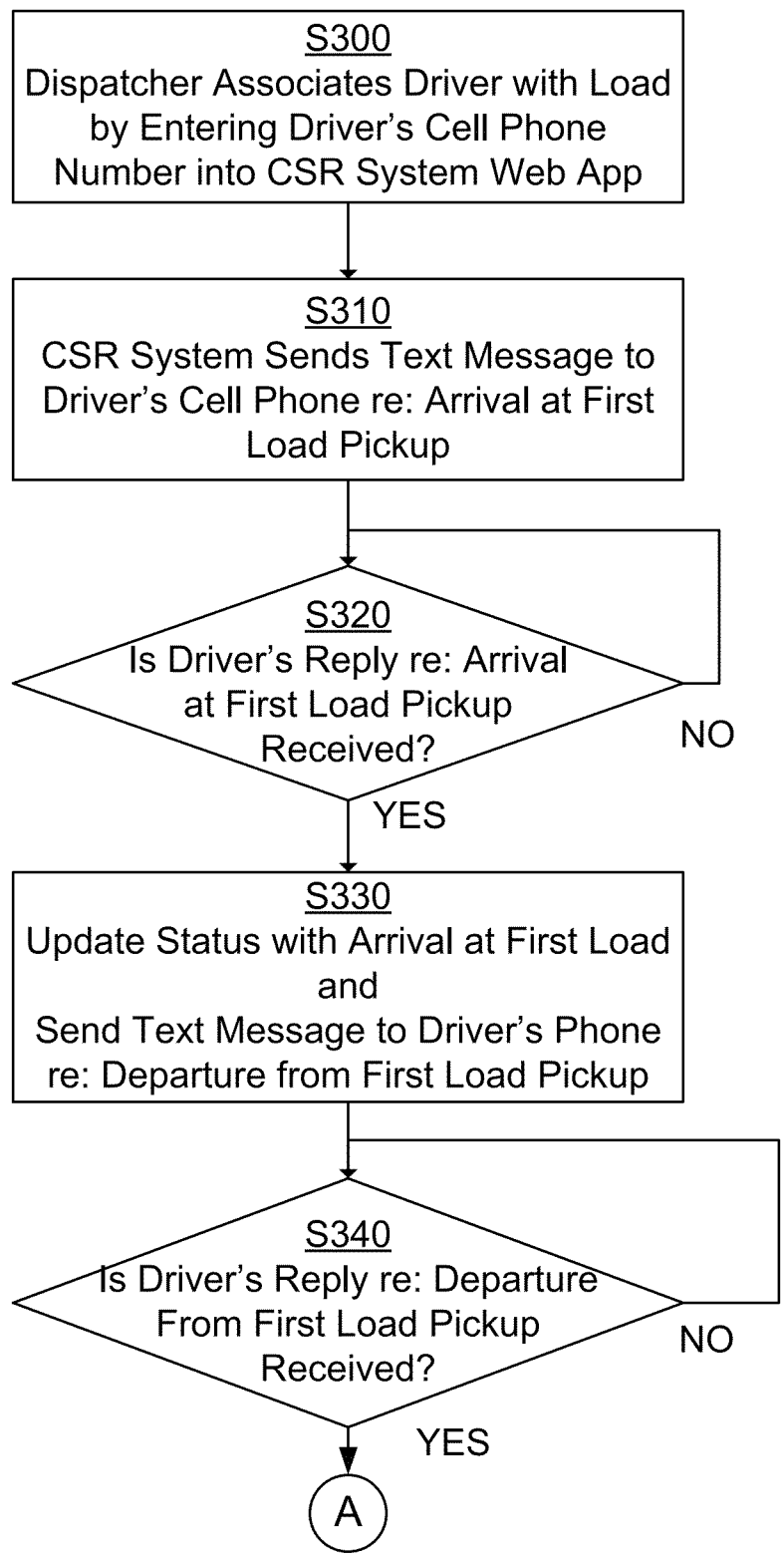
FIGS. 3A and 3B comprise a flow chart illustrating a method executed by a CSR System, according to an embodiment.
Figure 3B:
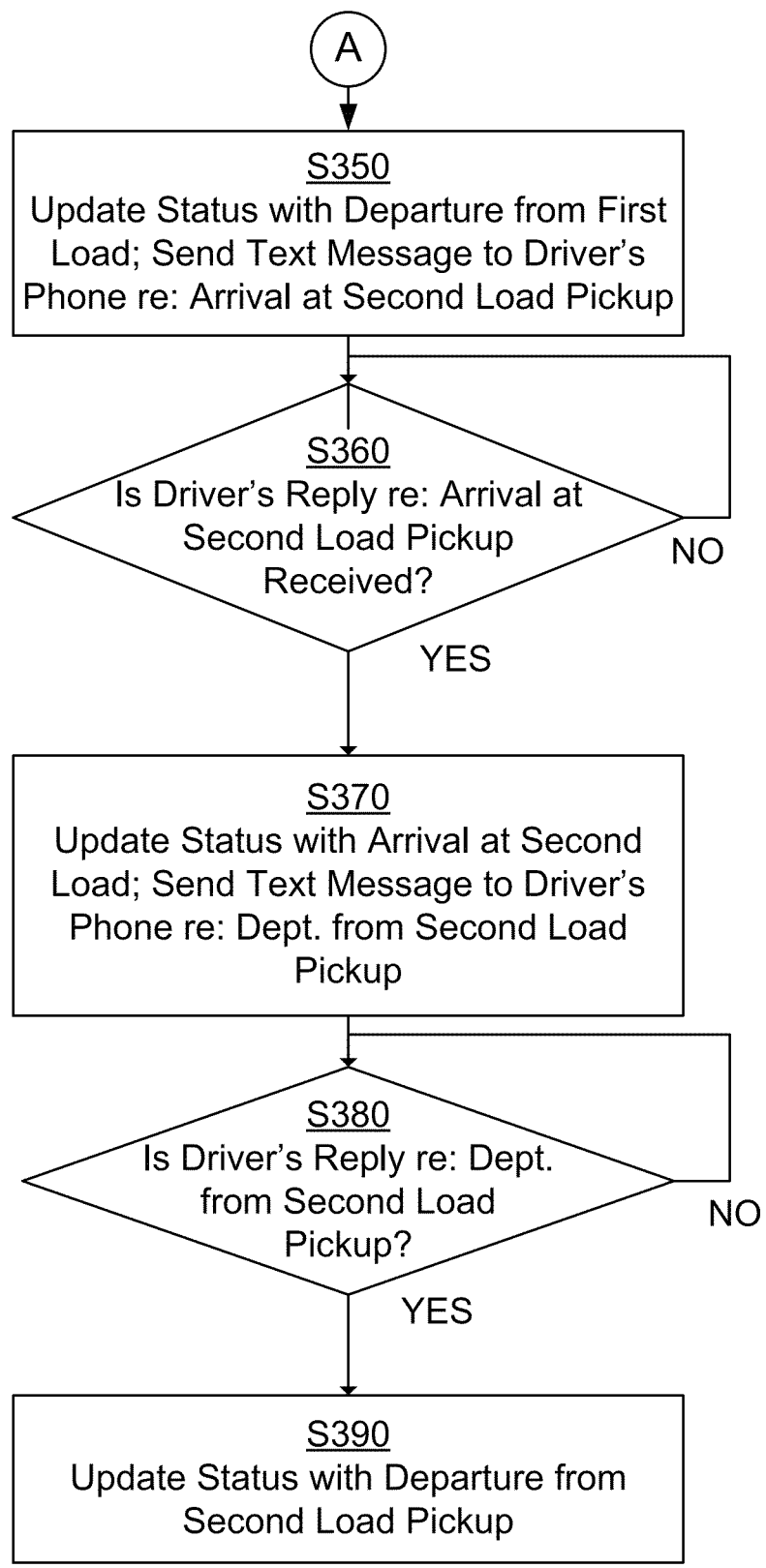

FIGS. 3A and 3B comprise a flow chart illustrating a method executed by the CSR System 100 of FIG. 1 in which normal operation occurs. In step S300, after a load is tendered, the dispatcher 212 associates the driver 222 with a load by entering the driver's 222 cell phone number into the web application 400 using the carrier computer 210 over a communication link 110 between the CSR System 100 and the carrier computer 210. The CSR System 100 then saves the cell phone number into the CSR database 104 and assigns the cell phone number of the driver 222 with a first load and route.

In step S310, the CSR System 100 sends a text message prompt 260 to the first SMS enabled cell phone 220 (of the driver 222) regarding arrival at the first load pickup point over a communication link 120 between the CSR System 100 and the SMS-enabled phone 220. The CSR System 100 may send the text message prompt 260 at a predetermined time prior to the scheduled time of the first load pickup arrival. The scheduled time of the first load pickup arrival may be an appointment, a computed arrival time at the load pickup, or a pickup for shipment. The text message prompt 260 preferably contains instructions to the driver 222 for responding to the CSR System 100. An example of a text message prompt 260 for the first load pickup arrival event is as follows: Load 8831548 [load ID] Reply with "1A" [instruction for responding] when arrived at Stop: MISSION MCMINNVILLE PLANT1037 Addr: 3101 NEORCHRD AVE, MCMINNVILLE, OR USA [pickup/destination]

In step S320, the CSR System 100 determines whether the driver's 222 reply regarding arrival at the first load pickup is received. If the driver 222 has responded to the text message prompt 260 from step S310 using the first SMS enabled cell phone 220 (YES), then the process proceeds to step S330. If the driver 222 has not responded to the text message prompt 260 (NO), the process returns to the start of step S320. For example, using the above text message prompt 260, the driver 222 should reply 262 with "1A" when he arrives at the scheduled first load pickup.

In step S330, after receiving the driver's 222 reply 262, the CSR System 100 updates the first load status as arrived in the CSR System database 104 and in the web application 400. For example, an "Updated by" field in the database 104 and the web application 400 may be the driver's 222 phone number, since the first SMS enabled cell phone 220 was used to send the reply 262 text messages and the cell phone number can represent a unique identifier for the driver (or some other unique driver identifier may be used).

The "Updated On" field may be the system date and time that the CSR System 100 received the reply. Furthermore, in step S330, the CSR System 100 sends a text message prompt 260 to the cell phone 220 and the driver 222 regarding departure from the first load pickup. For example, once the driver 222 replies 262 with "1A" in step S320, indicating arrival at the pickup point, he will receive a similar text message prompt 260 requesting him to reply 262 with "1D" when he departs from the first load pickup.

In step S340, the CSR System 100 determines whether the driver's 222 reply 262 regarding departure from the first load pickup is received. If the driver 222 has responded 262 to the text message prompt 260 (YES), for example, with "1D," then the process proceeds to step S350. If the driver 222 has not responded to the text message prompt 260 (NO), the process returns to the start of step S340.

In step S350, after receiving the reply 262 from the driver 222, the CSR System 100 updates the first load status as "departed" in the CSR System database 104 and in the web application 400. The CSR System 100 also sends a text message prompt 260 to the cell phone 220 regarding arrival at a second load pickup. For example, once the driver 222 replies 262 with "1D" using the first SMS enabled cell phone 220, he will receive a text message prompt 260 from the CSR System requesting him to reply with "2A" when he arrives at a scheduled second load pickup.

In step S360, the CSR System 100 determines whether the driver's 222 reply 262 regarding arrival at the second load pickup is received. If the driver 222 has responded to the text message prompt 260 (YES), for example, with "2A," then the process proceeds to step S370. If the driver 222 has not responded to the text message prompt 260 (NO), the process returns to the start of step S360.

In step S370, after receiving the text message reply 262, the CSR System 100 updates the second load status as arrived in the CSR System database 104 and in the web application 400. The CSR System also sends a text message prompt 260 to the cell phone 220 regarding departure from the second load pickup. For example, once the driver 222 replies 262 with "2A," he will receive text message prompt 260 requesting him to reply 262 with "2D" when he has departed from the second load pickup.

In step S380, the CSR System 100 determines whether the driver's 222 reply 262 regarding departure from the second load pickup is received. The overall process may be repeated for any number of loads, but there must exist some logical procedure for ending the process. In one embodiment, if the driver 222 has responded to the text message prompt 260 (YES), for example, with "2D," then the process ends and no more notifications or text messages will be sent to the SMS enabled cell phone 220. If the driver 222 has not responded to the text message prompt 260 (NO), the process returns to the start of step S380. In another embodiment, the process ends upon an indication by the driver that the last load has been delivered.

The above-described procedure may be repeated for a second carrier 200'. Significantly, the centralized server 102 is able to manage, track, and coordinate the activities of a plurality of carriers. Thus, it associates and tracks dispatchers, carrier computers/servers, drivers, and their cell phones with a carrier identifier, and manages these in its database 104. One possibility enabled by having the knowledge of a plurality of carriers is that the CSR System 100 may be able to assist in coordinating inter-carrier communications, i.e., if one carrier is having difficulties with a particular load, this information could be communicated to another carrier who may have available capacity.

In some situations, a load may need to be rejected and thus will have a rejected status. In that case, the CSR System 100 should preferably not be used for load status updates. Any phone number that might have been previously assigned to that load in the CSR System 100 can be removed. If a load is rejected after a text message has already been sent to the driver for arrival at a load pickup, then the CSR System 100 can send another text message notifying the driver that his phone number was removed from the load. Also, the CSR System will send the same text message to a driver if a phone number was updated or deleted from the load after the first text message was sent.

In order to use text messages for status updates in the CSR System 100, carrier codes should be optimized for a carrier or carriers for SMS texting. The configured carrier codes may be stored in the CSR System database 104. Carrier codes can be "short hand" messages that indicate a load status. Carrier codes may include numbers, letters, symbols, or a combination of each. For example, the method of FIGS. 3A and 3B uses an alpha-numeric combination for the carrier codes, where "1" and "2" respectively represents the load number and "A" and "D" respectively represents arrival and departure at a load pickup.

Figure 4A:
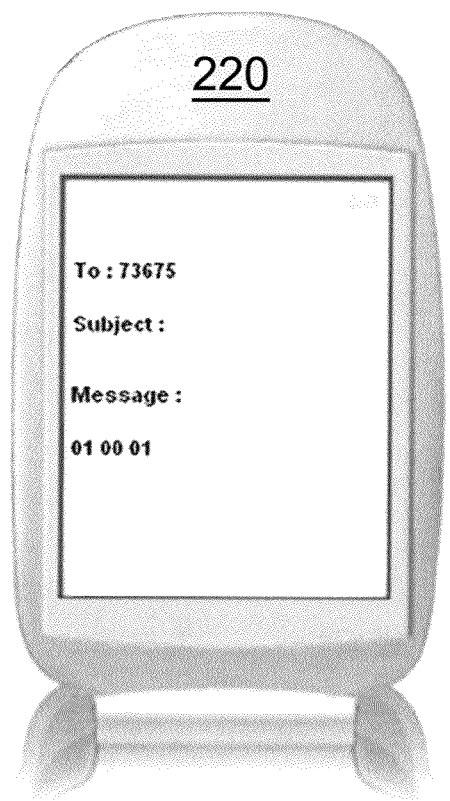
FIGS. 4A and 4B illustrate carrier codes used in status update text messages transmitted from an SMS enabled cell phone, according to an embodiment.
Figure 4B:

FIGS. 4A and 4B illustrate carrier codes used in status update text messages transmitted from an SMS enabled cell phone 220, according to another embodiment, which are displayed on a display screen of the phone 220. In this embodiment, the carrier codes only include numbers, which represents the stop/load number, any instance of delay, and arrival or departure events. Different carriers may use the same carrier codes or different carrier codes, and thus, the CSR System 100 is configured to store and handle both preset and customized carrier codes. The CSR System 100 may be configured to translate two different carrier codes from two different carriers that mean the same thing.

For example, the first carrier 200 might use "1A" to designate arrival at a first load location in the route, whereas a second carrier 200' might use "A.1". The centralized server 102 comprises algorithms that can translate such differing codes and execute a common algorithm that means, "the driver has arrived at the first location in the route". The algorithm can uses devices such as look-up tables, etc. Similarly, for outgoing messages, a differently formatted/coded message can be sent to the driver 222 of the first carrier 200 than is sent to the driver 222' of the second carrier 200', even though the messages mean the same thing. In this way, the CSR System 100 flexibly accommodates multiple carriers.

Figure 5:
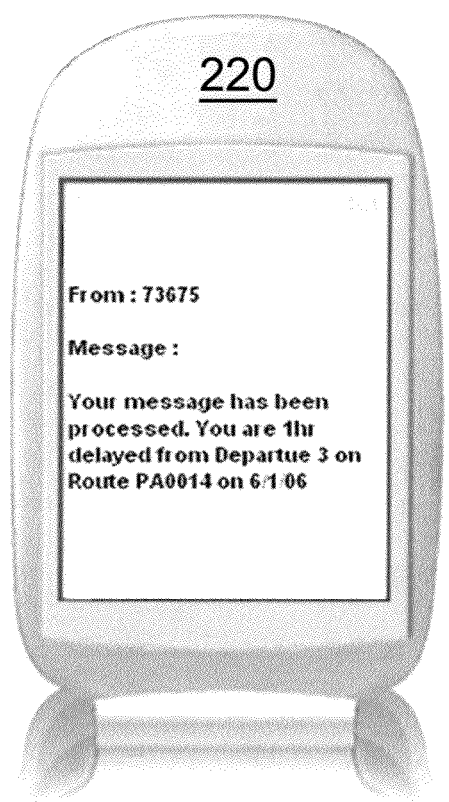
FIG. 5 illustrates a text message received by an SMS enabled cell phone in response to the text message of FIG. 4B.

FIG. 5 illustrates a confirmation text message received by the SMS enabled cell phone in response to the text message of FIG. 4B. In addition to sending text message prompt 260s to drivers with SMS enabled cell phones, the CSR System 100 may also send confirmation text messages to the drivers after receiving the drivers' replies. As shown in FIG. 5, the SMS enabled cell phone is displaying a confirmation text message sent from the CSR System 100 to the driver. The confirmation text message decodes the carrier code status update text message response of FIG. 4B, and thus provides the driver a way to check and correct any operator errors.

FIG. 6 illustrate another screen shot of the CSR System web application 400 of FIGS. 2A and 2B. Here, a Status Reporting Page 400-3 of the CSR System web application 400 is shown. The Status Reporting Page 400-3 includes various search fields and can be used to search for loads after a driver's cell phone number has been assigned to a load by the CSR System 100. The Load Status Page 400-4 displays the loads associated with the driver's cell phone number that are found using the Status Reporting Page 400-3. When a driver replies with load status updates, various fields in the Load Status Page 400-4 for the load (e.g., Actual Arrival Date/Time and Actual Departure Date/Time) are updated and displayed. The CSR System database 104 is also updated when the Load Status Page 400-4 is updated.

In the method described in FIGS. 3A and 3B, the text messaging process in the CSR System 100 assumes that a driver responds timely with the correct text for each load pickup event, and thus all updates are successful. However, there may be instances when a driver does not reply in a timely manner and/or does not reply with the correct text or carrier codes. In these cases, errors will be generated and will be available from the CSR System 100 for carrier managements to review. Below are some examples for such exceptions.

Figure 7A:
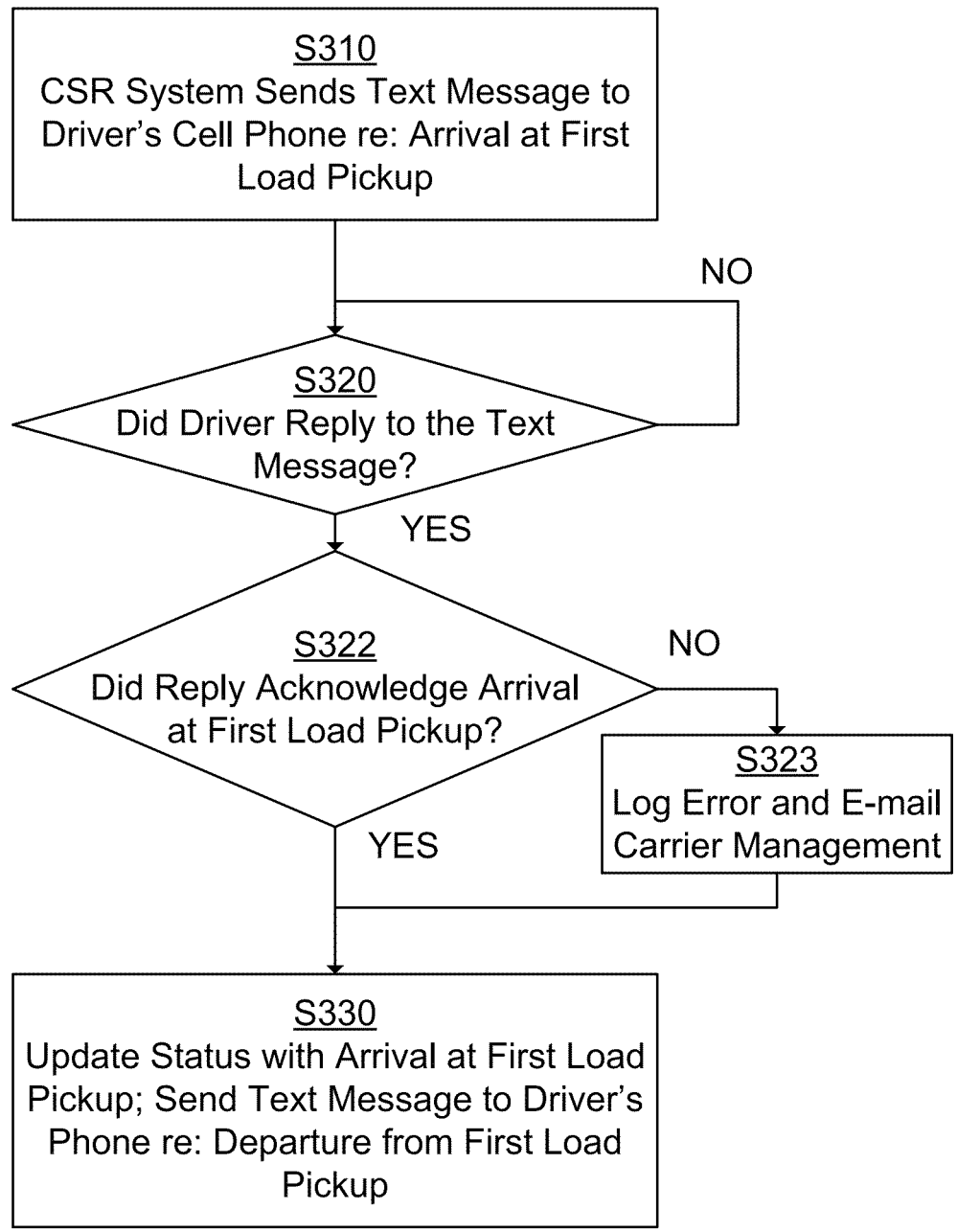
FIGS. 7A and 7B are flow charts illustrating a method for exception processing when a driver has not acknowledged arrival at a first load pickup, according to an embodiment.
Figure 7B:
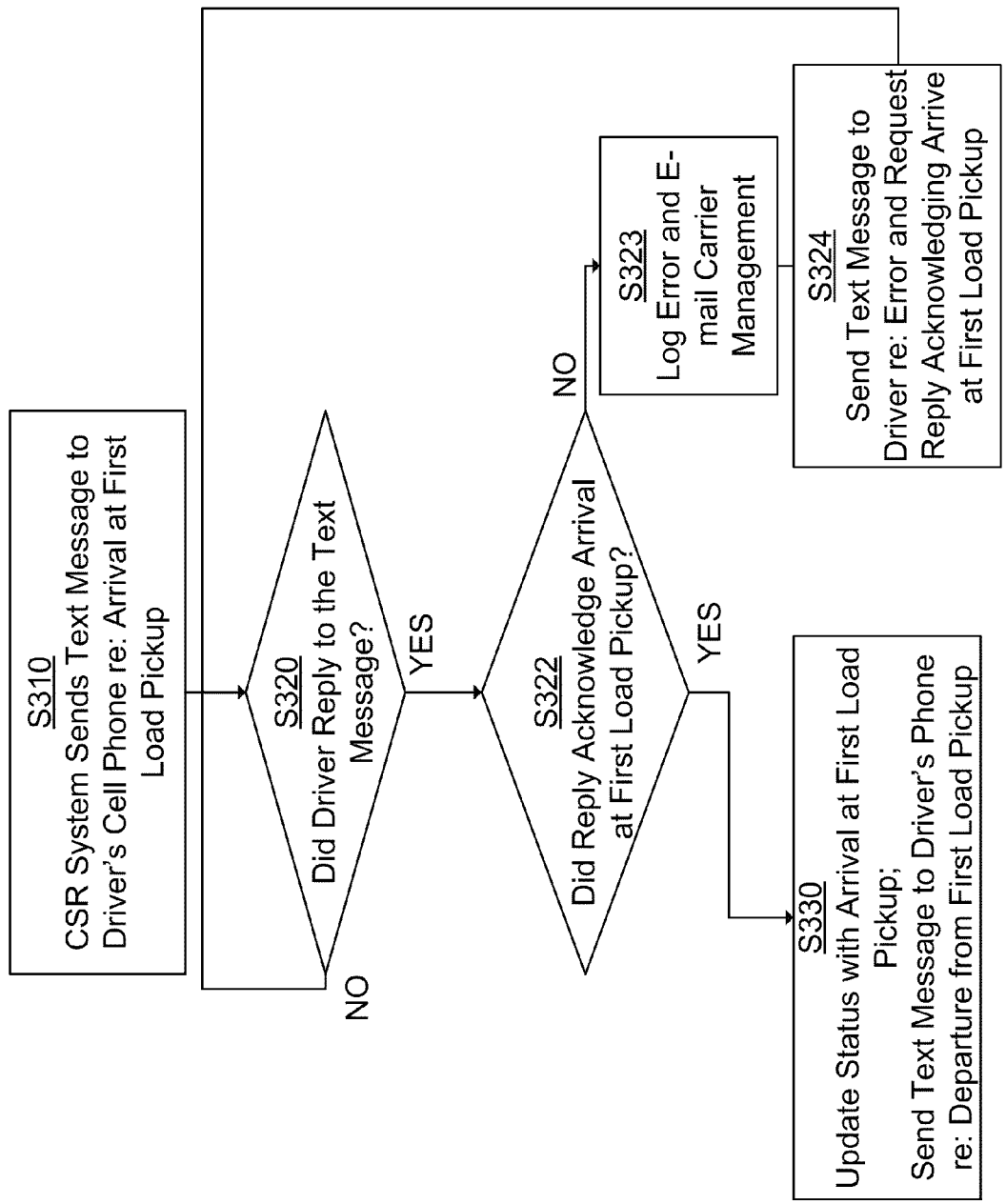

FIGS. 7A and 7B are flow charts illustrating a method for exception processing when a driver has not acknowledged arrival at a first load pickup, according to an embodiment. In step S310, the CSR System 100 sends a text message prompt 260 to the cell phone 220 regarding arrival at the first load pickup. Instead of proceeding to step S320 as in the method of FIG. 3A, the process proceeds to step S321. In step S321, the CSR System 100 determines whether the driver 222 has replied 262 to the text message prompt 260, for example, whether the driver 222 sent any response 262 to the CSR System 100 at all. If the driver 222 has responded 262 to the text message prompt 260 using the cell phone 220 (YES), then the process proceeds to step S322. If the driver 222 has not respond to the text message prompt 260 (NO), the process returns to the start of step S321.

In step 322, the CSR System 100 determines whether the response 262 from the driver 222 correctly acknowledges arrival at the first load pickup, for example, whether he texted with "1A" using the cell phone 220. If the response 262 correctly acknowledges arrival at the first load pickup (YES), the process proceeds to step S330. However, if the driver's 222 response did not correctly acknowledge arrival (e.g., replied with "1D" instead of "1A") (NO), then the process proceeds to step S323, where the CSR System 100 logs the error in the database 104 and may display the error in the web application 400. The CSR System 100 may also send an e-mail to the carrier management with an error notification, for example, "Updates are sent in the wrong sequence."

After step S323, in FIG. 7A, the process proceeds to step S330, and the driver 222 is not notified of the error. In another embodiment, the correct load status update may be entered manually from the CSR System web application 400. This is designed to ensure that the load status update process is as easy as possible for the driver 222. In an alternate embodiment, an error status is maintained and normal handling is not undertaken until the problem is resolved, and no more text messages are sent to the driver 222. In yet an embodiment, the driver 222 may be notified of the error, and, if possible, the driver 222 may be provided with instructions for resolving the problem.

In FIG. 7B, after step S323, the process proceeds to step S324, where the CSR System 100 sends a text message to the driver 222 with notification of the error and requests acknowledgement of arrival at the first load pickup. Then process then returns to the start of step S321.

In addition, the CSR System 100 may not require the arrival at a load pickup to be prior to the departure from the load pickup. In the case where the driver 222 replied with "1D" instead of "1A," the CSR System 100 may update the status of the first load pickup as departed and then proceed to prompting the driver 222 with the second load pickup.

Figure 8A:
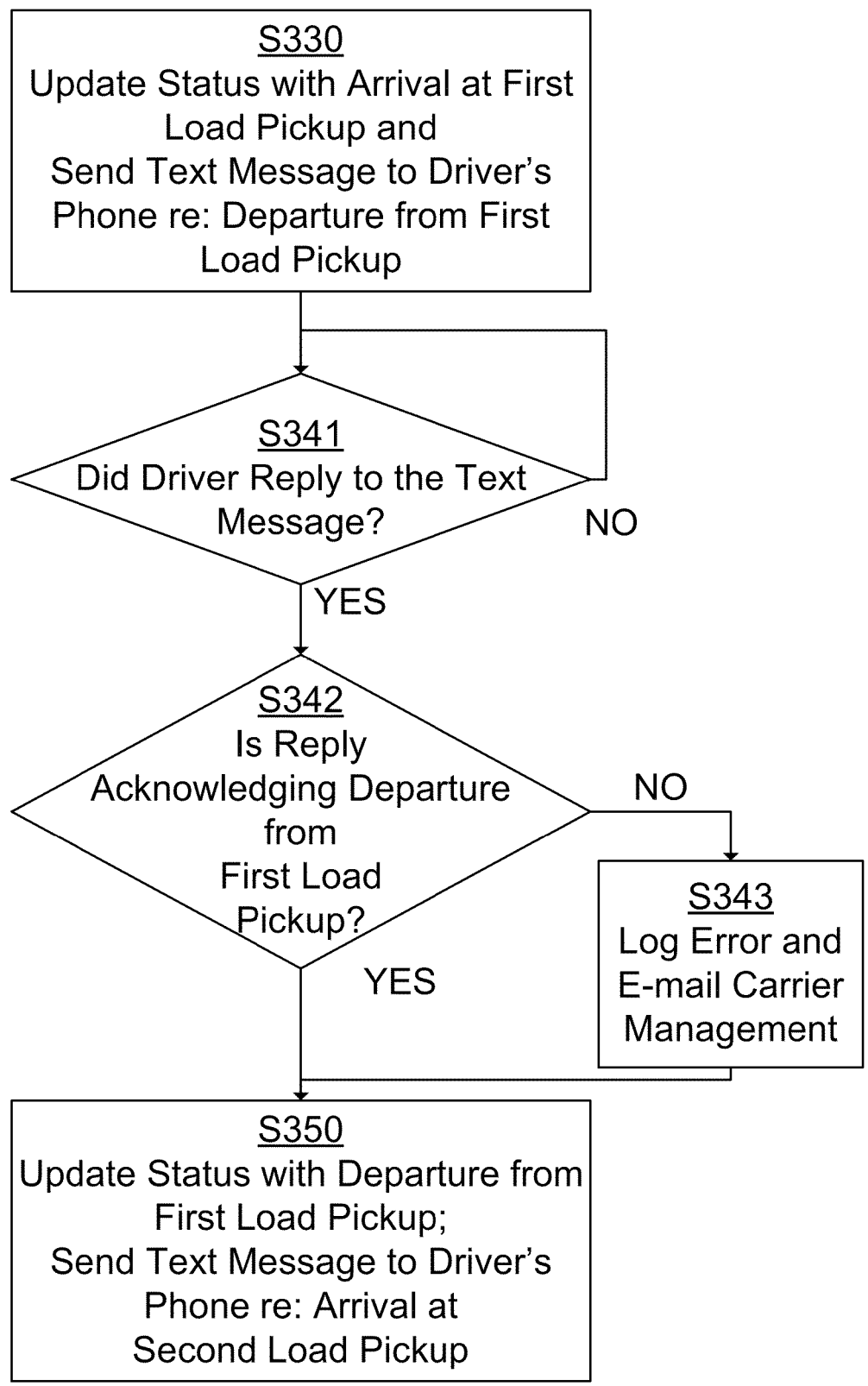
FIGS. 8A and 8B are flow charts illustrating a method for exception processing when a driver has not acknowledged departure from a first load pickup, according to an embodiment.
Figure 8B:
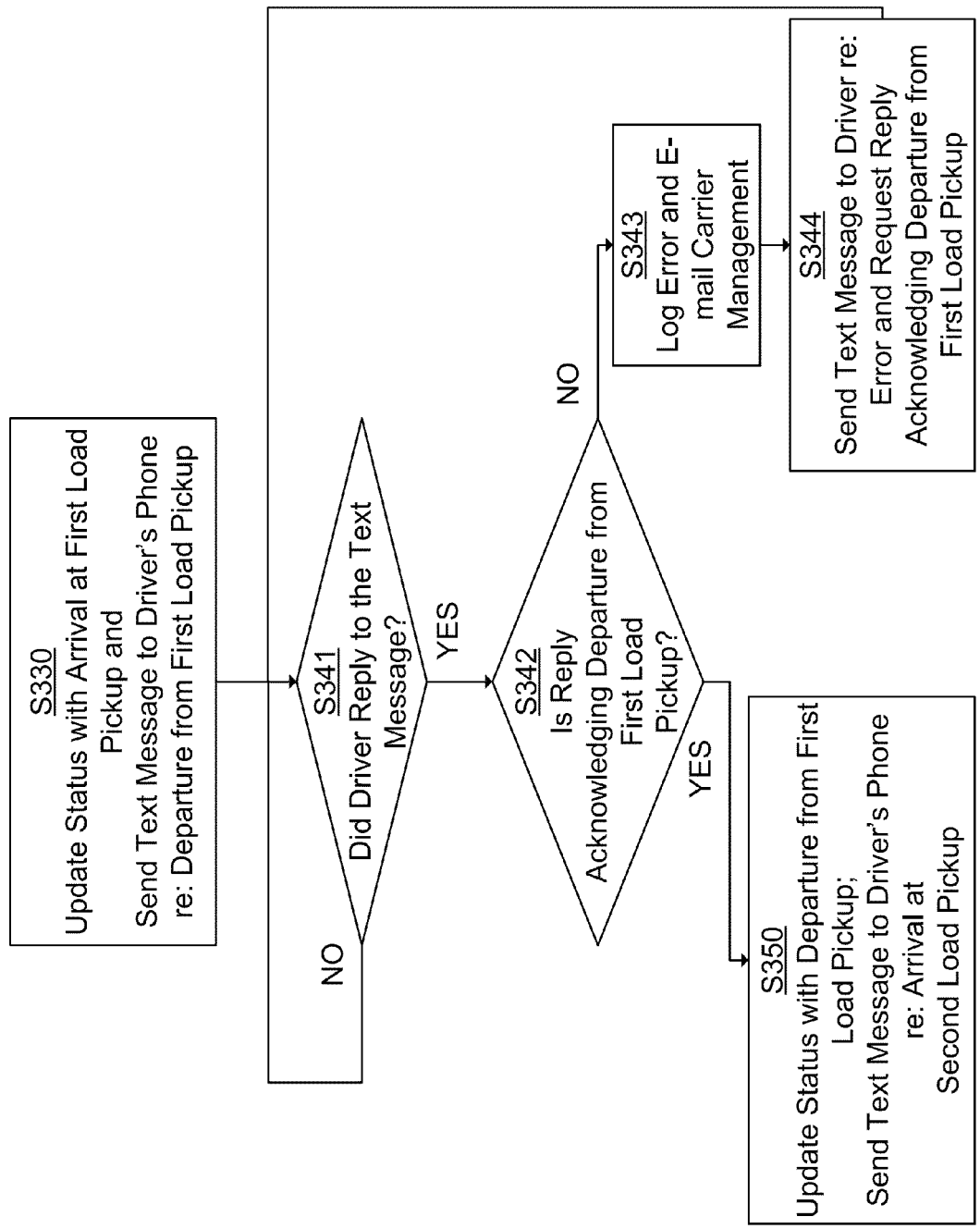

FIGS. 8A and 8B are flow charts illustrating a method for exception processing when a driver has not acknowledged departure from a first load pickup, according to an embodiment. In step S330, as in the method illustrate in FIG. 3A, the CSR System 100 sends a text message prompt 260 to the cell phone 220 regarding departure from the first load pickup. In step S341, the CSR System 100 determines whether the driver 222 has replied to the text message prompt 260, for example, whether the driver 222 sent any response to the CSR System 100 at all. If the driver 222 has responded to the text message prompt 260 (YES), then the process proceeds to step S342. If the driver 222 has not respond to the text message prompt 260 (NO), the process returns to the start of step S341.

In step 342, the CSR System 100 determines whether the response from the driver 222 correctly acknowledges departure from the first load pickup, for example, a response with "1D." If the response correctly acknowledges departure from the first load pickup (YES), the process proceeds to step S350. However, if the driver's 222 response did not correctly acknowledges arrival (e.g., replied with "2A" instead of "1D") (NO), then the process proceeds to step S343, where the CSR System 100 logs the error in the database 104 and may display the error in the web application 400. The CSR System 100 may also send an e-mail to the carrier management with an error notification, for example, "Updates are sent in the wrong sequence."

After step S343, in FIG. 8A, the process proceeds to step S350. In an alternative embodiment, the driver 222 can only send text message to the CSR System 100 once per event (pickup arrival/departure) in response to a text message prompt from the CSR System 100. If the driver 222 sends text message without a request from the CSR System 100, the text message will be rejected and no more text messages will be sent to the driver 222 for the corresponding load. In another embodiment, if the driver 222 replies with an incorrect text message, he cannot send another message with the correct previous text message. The process stops when the driver sends the incorrect text message, and no more text messages will be sent or accepted for corresponding load. The load will have to be updated manually through the CSR System web application 400.

In FIG. 8B, however, after step S343, the process proceeds to step S344, where the CSR System 100 sends a text message to the driver 222 with notification of the error and requests acknowledgement of departure from the first load pickup. Then process then returns to the start of step S341.

Figure 9:
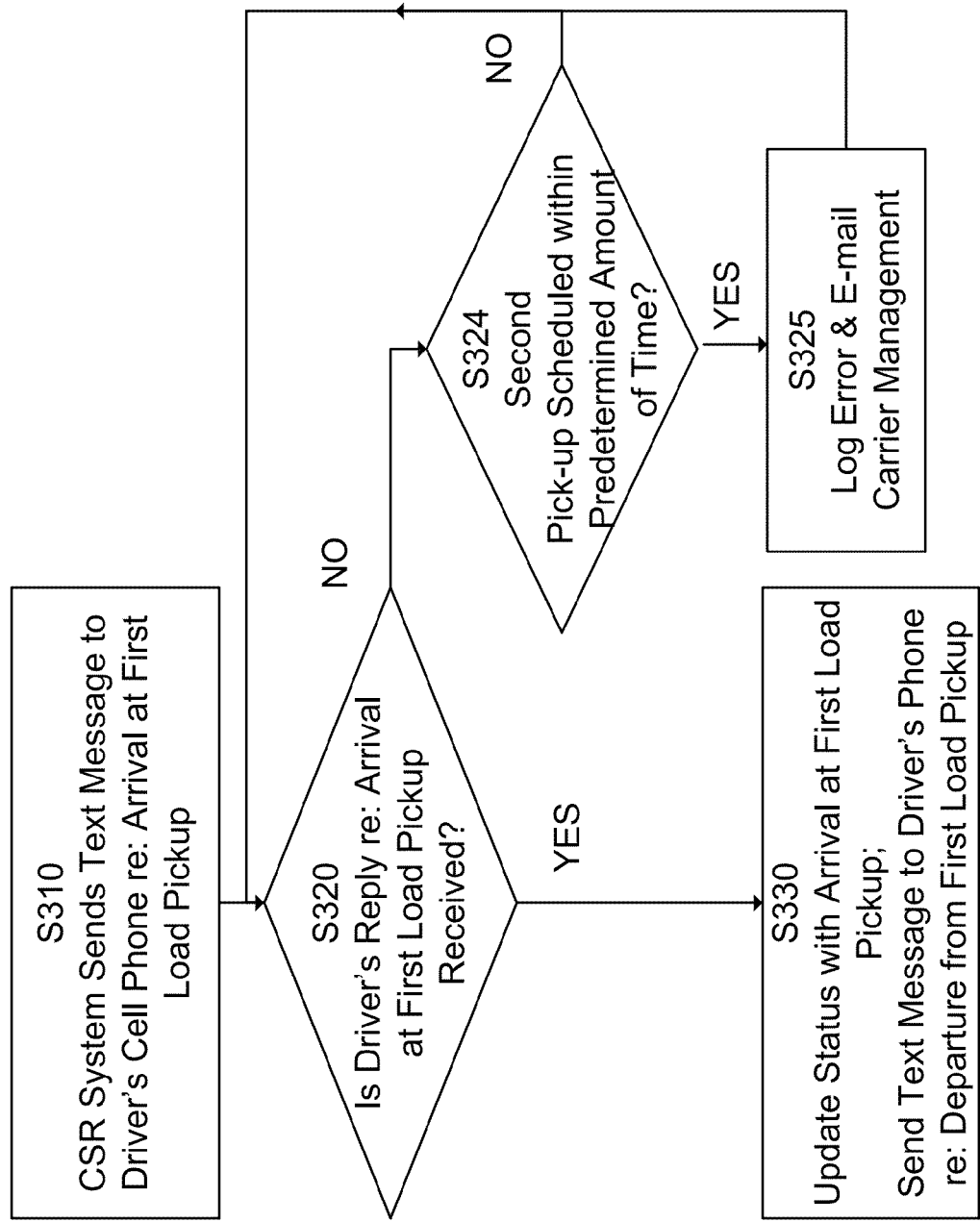
FIG. 9 is a flow chart illustrating a method for exception processing when a driver has not acknowledged arrival at a first load pickup and a second load pickup is scheduled with a predetermined amount of time, according to an embodiment.

FIG. 9 is a flow chart illustrating a method for exception processing when a driver has not acknowledged arrival at a first load pickup and a second load pickup is scheduled within a predetermined amount of time, according to an embodiment. In step S310, the CSR System 100 sends a text message prompt 260 to the first the driver 222 regarding arrival at the first load pickup. In step S320, the CSR System 100 determines whether the driver's 222 reply regarding arrival at the first load pickup is received. If the driver 222 responds to the text message prompt 260 (YES), then the process proceeds to step S330. If the driver 222 does not respond to the text message prompt 260 (NO), the process proceeds to step S324.

In step S324, the CSR System 100 determines whether a second load pick-up is scheduled within a predetermined amount of time. If NO, then the process returns to the start of step S320. If YES, then the driver 222 will not receive a text message prompting for the second load pickup until the first load pickup is complete. Furthermore, the CSR System 100 logs the error in the database 104 and may also display the error in the web application 400. The CSR System 100 may also send an e-mail to the carrier management system with an error notification, for example, "Previous load for the same phone number is not completed" and/or "Same phone number is assigned to multiple loads."

FIG. 10 is a flow chart illustrating a method for exception processing when multiple loads are associated with a single driver, according to an embodiment. In step S300, the dispatcher 212 associates the driver 222 with a load by entering the driver's 222 cell phone number into the web application 400. In step S301, the CSR System 100 determines whether multiple loads are associated with the driver's 222 cell phone number. If NO, the process proceeds to step S310. If YES, the process proceeds to step S302, where the CSR System 100 logs the error in the database 104 and may display the error in the web application 400. The CSR System 100 may send an e-mail to the carrier management with an error notification, for example, "Same phone number is assigned to multiple loads." Then in step S303, the CSR System 100 does not send any text message to the driver 222.

When a driver becomes familiar and comfortable with the CSR system 100, he may send a text message to the CSR System 100 for a load that is assigned to his phone number but scheduled in the future, before the CSR System 100 sends him the text message prompt for arrival at the first load pickup. In this instance, the CSR System 100 will send a text message to the driver notifying him that no active loads is associated with his phone number. An example text message may be: No active loads found for this phone number. Please contact operations. Here, the load is not considered as active. Even if the load is assigned to the driver's phone number, the driver can only send the first text message for this load in response to the text message from the CSR System 100 for arrival at the first load pick up. The CSR System 100 may also send an e-mail to the carrier management with an error notification, for example, "No load assigned to the phone number."

Finally, although the exception processing is individually described, they may be combined and incorporated into the method of FIGS. 3A and 3B. Furthermore, the exception processing described herein are examples only and should not be considered as exhaustive or limiting.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

TABLE OF REFERENCE CHARACTERS

100 CSR System
102 CSR System server
104 CSR System database
104.1, First carrier, second carrier data
104.2
110, 110' comm. link between CSR System and first, second carrier computer
120, 120' comm. link between CSR system and first, second SMS-enabled phone
130, 130' comm. link between CSR System and first, second carrier server
200, 200' first, second carrier
210, 210' first, second carrier computer
212, 212' first, second carrier dispatcher
220, 220' first, second sms-enabled cell phone
222, 222' first, second carrier driver
230, 230' carrier server
260 communication messages to driver, text message prompt
262 communication messages from driver, text message reply
400 CSR System web application
400-1 accept/reject page screen shot
400-2 load status page screen shot
400-3, status reporting page screen shot
400-4

What is claimed is:

1. A method for managing carrier status via the Short Message Service (SMS) by a centralized system in a multi-carrier environment, comprising:
   a) associating, by a dispatcher of a carrier, a driver with a first load to be transported, using an SMS-enabled cellphone number of the driver;
   b) storing the association of driver and load in a database of the system using a centralized server comprising a processor and non-volatile storage media, along with a unique identifier of the carrier;
   c) transmitting, by the server to the driver, a first instruction as a text message to the driver's cell phone, wherein the first instruction contains information about the first load's location, along with instructions for replying upon arrival;
   d) receiving, by the server from the driver, a first response consistent with the instructions for replying upon arrival;
   e) updating, by the server, a status associated with the driver's first response in the database;
   f) transmitting, by the server to the driver, a second instruction as a text message to the driver's cell phone, wherein the second instruction contains instructions for replying upon departure;
   g) receiving, by the server from the driver, a second response consistent with the instructions for replying upon departure;
   h) updating, by the server, a status associated with the driver's second response;
   i) repeating (a)-(h) for a second load to be transported for the driver;
   j) repeating (a)-(i) for a second driver of a second carrier; and
   k) providing, by the centralized system, status reports related to both the driver and associated load, and the second driver and associated load.

2. The method of claim 1, wherein the server comprises a web-based service that implements the associating, the storing, the transmitting, the updating, and the receiving.

3. The method of claim 1, further comprising associating a second driver with the carrier and performing (a)-(h) for a different load.

4. The method of claim 1, wherein the repeating (a)-(h) for the second driver is performed concurrently with (a)-(h) for the driver.

5. The method of claim 1, wherein the providing of the status reports is performed by transmitting status messages from the server to a carrier server.

6. The method of claim 5, wherein the transmitting of status messages is a transmitting of e-mails.

7. The method of claim 1, further comprising removing any driver identification from a rejected load.

8. The method of claim 1, wherein the associating is performed by the dispatcher using a web-based client.

9. The method of claim 1, wherein the instructions for replying consists of a two-character reply.

10. The method of claim 1, wherein the instructions for replying upon at least one of arrival or departure differ between the carrier and the second carrier.

11. The method of claim 1, wherein a mapping of instructions to action are stored in a lookup table in the database.

12. The method of claim 1, further comprising, after receiving a requested response, transmitting a conformation message to the driver.

13. The method of claim 1, further comprising:
   receiving, by the server from a requester, a search request to search for loads; and
   providing results of the request that are based on information stored in the database.

14. The method of claim 1, further comprising, updating, in a status page, displayed load information in response to the receiving at least one of the first response and the second response.

15. The method of claim 1, wherein when an erroneous response is received, performing at least one of logging an error in the database and notifying the carrier of the error.

16. The method of claim 15, wherein the notifying is performed by sending an e-mail.

17. The method of claim 15, further comprising notifying the driver of the error.

18. The method of claim 17, further comprising transmitting instructions to the driver for resolving the error.

19. The method of claim 1, wherein when at least one of the first and second response is not received within a predetermined amount of time for a subsequent pickup, performing at least one of logging an error in the database and notifying the carrier of the error.

20. The method of claim 1, further comprising:
determining, by the server, when multiple loads are associated with a single driver; and then performing at least one of logging an error in the database and notifying the carrier of the error.

21. A non-transitory computer program product, comprising a computer usable medium having a computer readable program code embodied therein, said computer readable program code adapted to be executed to implement the method of claim 1.

22. A centralized system for managing carrier status via the Short Message Service (SMS) in a multi-carrier environment, comprising:
a centralized server comprising:
a processor for executing routines;
a non-volatile database for storing data of the centralized system;
a) a routine that associates, via a carrier dispatcher, a driver with a first load to be transported, using an SMS-enabled cellphone number of the driver;
b) a routine that stores the association of driver and load in the database, along with a unique identifier of the carrier;
c) a transmitter that transmits, to the driver, a first instruction as a text message to the driver's cell phone, wherein the first instruction contains information about the first load's location, along with instructions for replying upon arrival;
d) a receiver that receives, from the driver, a first response consistent with the instructions for replying upon arrival;
e) an updating routine that updates a status associated with the driver's first response in the database;
wherein:
f) the transmitter transmits, to the driver, a second instruction as a text message to the driver's cell phone, wherein the second instruction contains instructions for replying upon departure;
g) the receiver receives, from the driver, a second response consistent with the instructions for replying upon departure;
h) the server updates a status associated with the driver's second response;
i) the server repeats (a)-(h) for a second load to be transported for the driver;
j) the server repeats (a)-(i) for a second driver of a second carrier; and
k) the server provides status reports related to both the driver and associated load, and the second driver and associated load.

* * * * *